United States Patent [19]

Gibson

[11] 4,059,370

[45] Nov. 22, 1977

[54] ROTARY ENGINE HAVING LOW THERMAL CONDUCTIVITY ROTOR

[75] Inventor: Myron R. Gibson, Edelstein, Ill.

[73] Assignee: Caterpillar Tractor Co., Peoria, Ill.

[21] Appl. No.: 699,757

[22] Filed: June 25, 1976

[51] Int. Cl.² .......... F01C 1/02; F01C 21/08; F01C 21/04; F01C 19/08

[52] U.S. Cl. .................. 418/56; 418/141; 418/142; 418/152; 418/91

[58] Field of Search .............. 418/50, 56, 141, 142, 418/152, 178, 179, 91; 123/8.01, 191 A, 193 C, 193 P, 193 CP

[56] References Cited

U.S. PATENT DOCUMENTS

| 974,803 | 11/1910 | Lukacsevics | 418/141 |
|---|---|---|---|
| 3,081,745 | 3/1963 | Hurley | 418/142 |
| 3,307,453 | 3/1967 | Nilsson et al. | 418/152 |
| 3,601,513 | 8/1971 | White | 418/179 |
| 3,749,072 | 7/1973 | Schweikher | 123/193 C |
| 3,802,811 | 4/1974 | Ruf et al. | 418/142 |
| 3,822,973 | 7/1974 | Prasse et al. | 418/142 |

FOREIGN PATENT DOCUMENTS

| 2,312,263 | 9/1974 | Germany | 418/152 |
|---|---|---|---|
| 2,109,139 | 8/1972 | Germany | 123/193 P |

*Primary Examiner*—John J. Vrablik
*Attorney, Agent, or Firm*—Wegner, Stellman, McCord, Wiles & Wood

[57] ABSTRACT

A rotary engine having a high surface to volume ratio including a housing having intake and exhaust ports and defining a chamber, a shaft journalled in the housing to extend therethrough and having an eccentric within the chamber, and a rotor on the eccentric within the chamber, the rotor having a body consisting essentially of a material having a low coefficient of thermal conductivity.

3 Claims, 2 Drawing Figures

ROTARY ENGINE HAVING LOW THERMAL CONDUCTIVITY ROTOR

BACKGROUND OF THE INVENTION

This invention relates to rotary engines such as trochoidal engines, slant axis rotary engines, or the like.

Prior art of possible relevance includes U.S. Pat. No. 3,359,956 issued Dec. 26, 1967 to Bentele.

Rotary engines, such as trochoidal engines, and slant axis rotary engines, have unusually high surface to volume ratios considered at the minimum volume position of the rotor within the chamber. As a consequence, it is extremely difficult to achieve good combustion and the resulting high thermal efficiency along with a low rate of heat rejection to the coolant.

SUMMARY OF THE INVENTION

It is the principal object of the invention to provide a new and improved rotary engine wherein a low rate of heat rejection is attained to thereby improve combustion to obtain high thermal efficiency and minimize emissions.

An exemplary embodiment of the invention achieves the foregoing objects in a rotary engine having a high surface to volume ratio and including a housing having intake and exhaust ports and defining a chamber. A shaft is journalled in the housing to extend through the chamber and has an eccentric within the chamber. A rotor is journalled on the eccentric within the chamber and the rotor has a body consisting essentially of a material having a low coefficient of thermal conductivity.

In a preferred embodiment, the rotor body is formed of a ceramic material.

The engine may be any type of rotary engine having a high surface to volume ratio and according to one embodiment, is a trochoidal engine.

In a highly preferred embodiment, the rotor carries seals which sealingly engage the walls of the chamber and metallic grooved inserts are disposed in the rotor body for receiving the seals in the grooves of the inserts.

In a highly preferred embodiment, the body is in compression by the inserts for operating conditions of the engine to maximize the life of the rotor body.

In a preferred embodiment of the invention, the portions of the rotor body in near or partial contact with the housing have knurled surfaces to promote the maintenance of a good lubricating oil film.

Other objects and advantages will become apparent from the following specification taken in connection with the accompanying drawings.

DESCRIPTION OF THE PREFERRED EMBODIMENT

Figure 1:
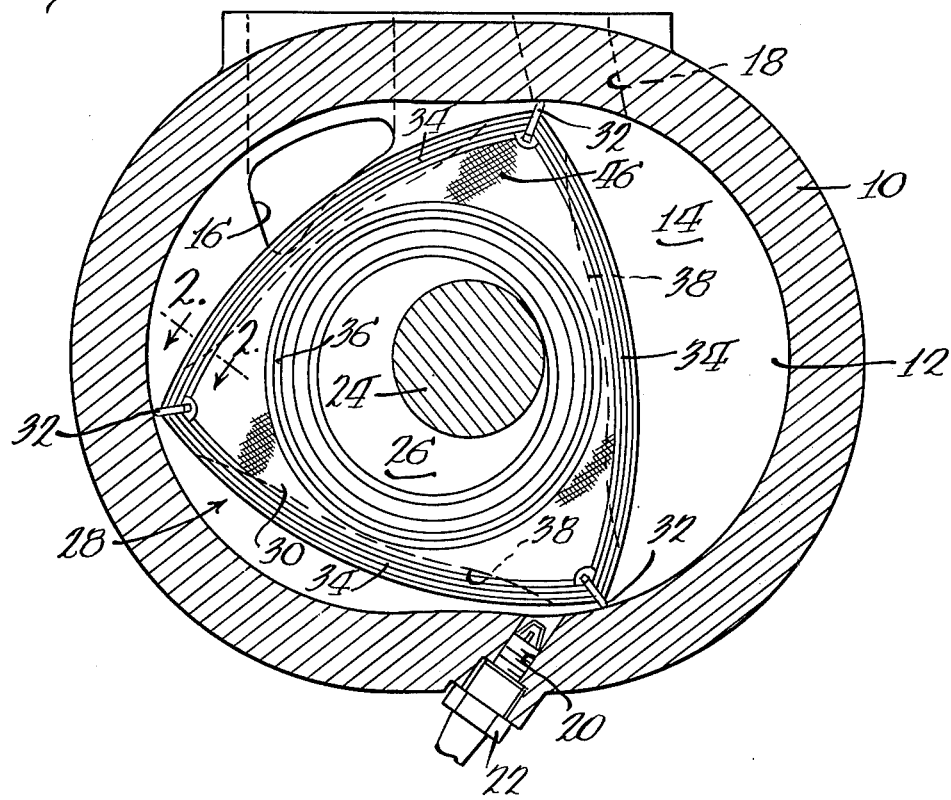
FIG. 1 is a sectional view of a rotary engine, specifically, a trochoidal engine, made according to the invention.

An exemplary embodiment of an engine made according to the invention is illustrated in FIG. 1 in the form of a trochoidal engine. However, it is to be understood that the invention is applicable to other types of rotary engines, such as a slant axis rotary engine, such as that disclosed by Clarke in U.S. Pat. No. 3,485,218, issued Dec. 23, 1969. Other types of rotary engines are known and the invention will have utility therein, particularly where the same have high surface to volume ratios.

The embodiment of the invention illustrated in FIG. 1 includes a central housing member 10 flanked by two end housings 12 (only one of which is shown) to define a chamber 14. One or both of the end housings 12 is provided with an intake port 16 through which combustion air is introduced. In the embodiment illustrated, fuel will be itnroduced into the combustion air by a suitable carburetor (not shown), but it is to be understood that the invention will find utility in mechanisms employing fuel injection rather than carburation.

The center housing 10 is provided with an exhaust port 18 and a bore 20 for receipt of a spark plug 22. Again, it is to be understood that the use of a spark plug 22 is not necessary if the mechanism parts are interrelated so as to ring about sufficiently high compression ratios that the mechanism can operate on a diesel cycle.

A shaft 24 is journalled in the housing in a conventional fashion and includes an eccentric 26 within the chamber 14. In the case of a slant axis rotary mechanism, the eccentric would be angularly offset with respect to the longitudinal axis of the shaft 24.

A rotor, generally designated 28, is located within the chamber 14 and is journalled on the eccentric 26. According to the invention, the rotor 28 includes a rotor body 30 which consists essentially of a material having a low thermal conductivity. Stated another way, the rotor body 30 is formed of a material that would be considered to be an insulator in the usual sense of the word. In a highly preferred embodiment, the rotor body 30 is formed of a ceramic material.

It is, of course, necessary that the material of which the body 30 is formed have sufficient strength through the range of operating temperatures of the engine to withstand the various forces applied thereto. An extremely large number of materials having the requisite strength and insulating qualities are described in U.S. Pat. Nos. 3,734,767 issued May 22, 1973 and 3,789,096 issued Jan. 29, 1974, both to Church et al., the details of which are herein incorporated by reference.

As is typical of trochoidal mechanisms, the rotor body 30 is formed in a generally triangular configuration and at each apex carries an apex seal 32 sealingly engaging the walls of the chamber defined by the center housing 10. The sides of the rotor body 30, near the outer extremity thereof, carry end seals, which are compression seals and which engage the corresponding ones of the side walls of the chamber 14 defined by the end housings 12. Piston seals (sometimes termed "bolts") may be employed at the juncture of the end seals 34 and the apex seals 32.

Considerably radially inwardly of the end seals 34, the rotor body 30 carries one or more oil seals 36, which also sealingly engage the end housings 14. Lastly, the rotor body 30 is provided with pockets or craters 38 shaped to optimize combustion and to provide a volume in which compressed air or compressed air and fuel mixture is transported through the waist of the engine.

Figure 2:
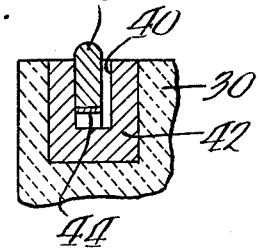
FIG. 2 is an enlarged, sectional view taken approximately along the line 2—2 of FIG. 1.

Referring to FIG. 2, it will be seen that the end seals 34 are disposed in grooves 40 in metallic inserts 42 within the rotor body 30. The inserts 42 also receive undulating biasing springs 44 by which the seals 32 are biased into engagement with the end housings 12. Similar inserts (not shown) may be employed at the apexes of the rotor for receipt of the apex seals 32 and piston seals, if used. Such inserts are also employed, if desired, for receipt of the oil seals 36 and may be employed in assembling the bearing (not shown) interposed between the eccentric 26 and the rotor 28 to the rotor body 30 as well as in mounting the timing gear (not shown) to the rotor body.

To promote long life of the rotor, it is preferred that the body 30 be in compression for operating conditions of the engine to avoid the creation of tensile stresses in the rotor body 30. This can be achieved by placing the inserts in tension as, for example, interconnecting the inserts to form a "cage-like" structure which is placed in tension as the body is formed by any suitable conventional means. Upon formation of the rotor body, the inserts will generate compressive stresses in the rotor body 30.

Finally, to provide conditions conducive to the maintenance and/or formation of an adequate oil film, those portions of the rotor body which are in near or partial contact with the housing during operation, are provided with a knurled surface 46. In the case of a trochoidal mechanism, the sides of the rotor will be knurled. If the rotor body 30 is molded or cast, the knurling can be molded therein and finish machined to have minute grooves of a depth on the order of 1 to 10 microinches.

In some instances, no provision will be provided for the cooling of the rotor 30. In other instances, some cooling may be desirable in the vicinity of the various seals. In the latter instance, suitable coolant passages to such regions can be provided through conventional coring or machining techniques along with provision for the conveying of a coolant, in a conventional fashion, to such passages.

From the foregoing, it will be appreciated that a rotary engine made according to the invention optimizes combustion by minimizing heat rejection to thereby maximize thermal efficiency and minimize emissions.

What is claimed is:

1. In a rotary engine having a high surface to volume ratio, the combination of:
    a housing having intake and exhaust ports and defining a chamber;
    a shaft journalled in the housing to extend through the chamber and having an eccentric within the chamber;
    a rotor journalled on said eccentric within said chamber, said rotor having a body consisting essentially of a ceramic material;
    seals carried by said rotor sealingly engaging the walls of the chamber; and
    metallic, grooved inserts in said rotor body for receiving the seals in the groove thereof, means placing said insets in tension so that said body is in compression.

2. The rotary engine of claim 1 wherein said inserts are interconnected.

3. In a rotary engine having a high surface to volume ratio, the combination of:
    a housing having intake and exhaust ports and defining a chamber;
    a shaft journalled in the housing to extend through the chamber and having an eccentric within the chamber;
    a rotor journalled on said eccentric within said chamber, said rotor haing a body consisting essentially of a ceramic material;
    portions of said body in near or partial contact with said housing having knurled surfaces; and
    seals carried by said rotor and sealingly engaging said housing
    metallic, grooved inserts in said rotor body for receiving the seals in the groove thereof, means placing said inserts in tension so that said body is in compression.

* * * * *